US008360456B2

(12) United States Patent
Peruzzo

(10) Patent No.: US 8,360,456 B2
(45) Date of Patent: Jan. 29, 2013

(54) APPARATUS FOR TOWING BICYCLES

(76) Inventor: Paola Peruzzo, Rosa (IT)

( * ) Notice: Subject to any disclaimer, the term of this patent is extended or adjusted under 35 U.S.C. 154(b) by 0 days.

(21) Appl. No.: 13/368,406

(22) Filed: Feb. 8, 2012

(65) Prior Publication Data
US 2012/0205892 A1    Aug. 16, 2012

(30) Foreign Application Priority Data

Feb. 10, 2011 (IT) .............. PD2011A0035

(51) Int. Cl.
B62K 13/02    (2006.01)
B62K 27/00    (2006.01)
(52) U.S. Cl. ......... 280/204; 280/231; 280/292; 280/402
(58) Field of Classification Search .................. 280/204, 280/231, 292, 272, 239, 202, 402, 493, 209
See application file for complete search history.

(56) References Cited

U.S. PATENT DOCUMENTS

| 5,695,208 | A | * | 12/1997 | Baechler et al. | ............... 280/204 |
| 5,842,710 | A | * | 12/1998 | Couture | ........................ 280/204 |
| 6,155,582 | A | | 12/2000 | Bourbeau | |
| 7,234,719 | B2 | * | 6/2007 | Giese | ............................. 280/292 |
| 2003/0178806 | A1 | * | 9/2003 | Nelson | ........................... 280/204 |
| 2004/0145147 | A1 | * | 7/2004 | Asbury et al. | ................. 280/204 |
| 2008/0303239 | A1 | | 12/2008 | Underhaug | |
| 2010/0013187 | A1 | * | 1/2010 | Oxley | .......................... 280/402 |

FOREIGN PATENT DOCUMENTS

DE    9211422.9    3/1993
WO    2004085234 A2    10/2004

* cited by examiner

Primary Examiner — Anne Marie M Boehler
(74) Attorney, Agent, or Firm — Cantor Colburn LLP

(57) ABSTRACT

Apparatus for towing bicycles, comprising a towing arm, a connector, adapted to fix the towing arm to a towing vehicle, a joint for interconnection between the towing arm and the connector, which defines a first oscillation axis and a second oscillation axis, the first oscillation axis being parallel to the resting surface of the towing bicycle to which the connector is coupled during use, a fork for connection of the towing arm to the hub of the front wheel of the bicycle to be towed, the fork being locked to the towing arm during use, a strut pivoted on the towing arm, and a coupling assembly which is adapted for connection of the strut to the bicycle to be towed. The first oscillation axis is transverse to the anteroposterior direction of the towing bicycle and the second oscillation axis is perpendicular to the resting surface.

7 Claims, 6 Drawing Sheets

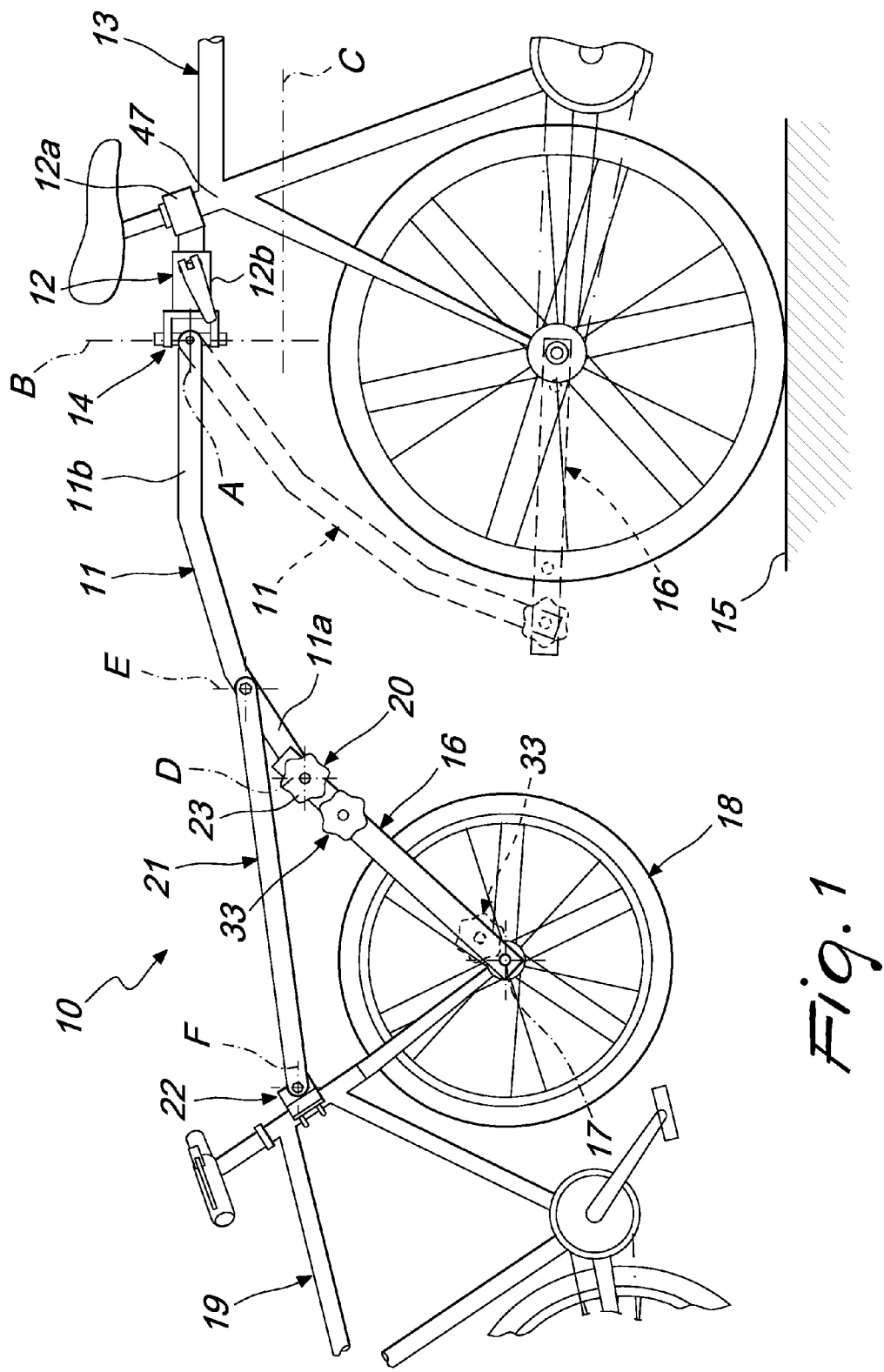

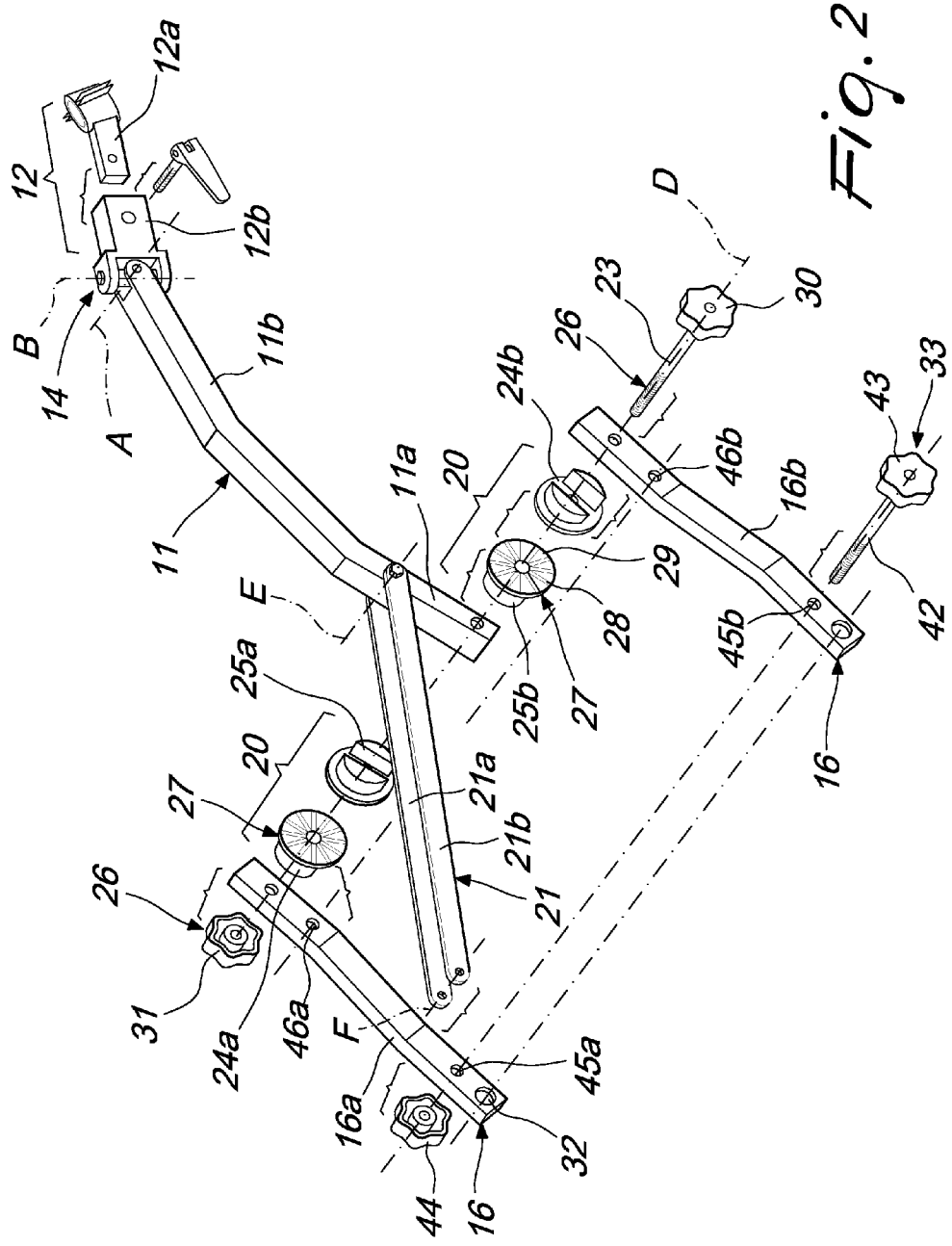

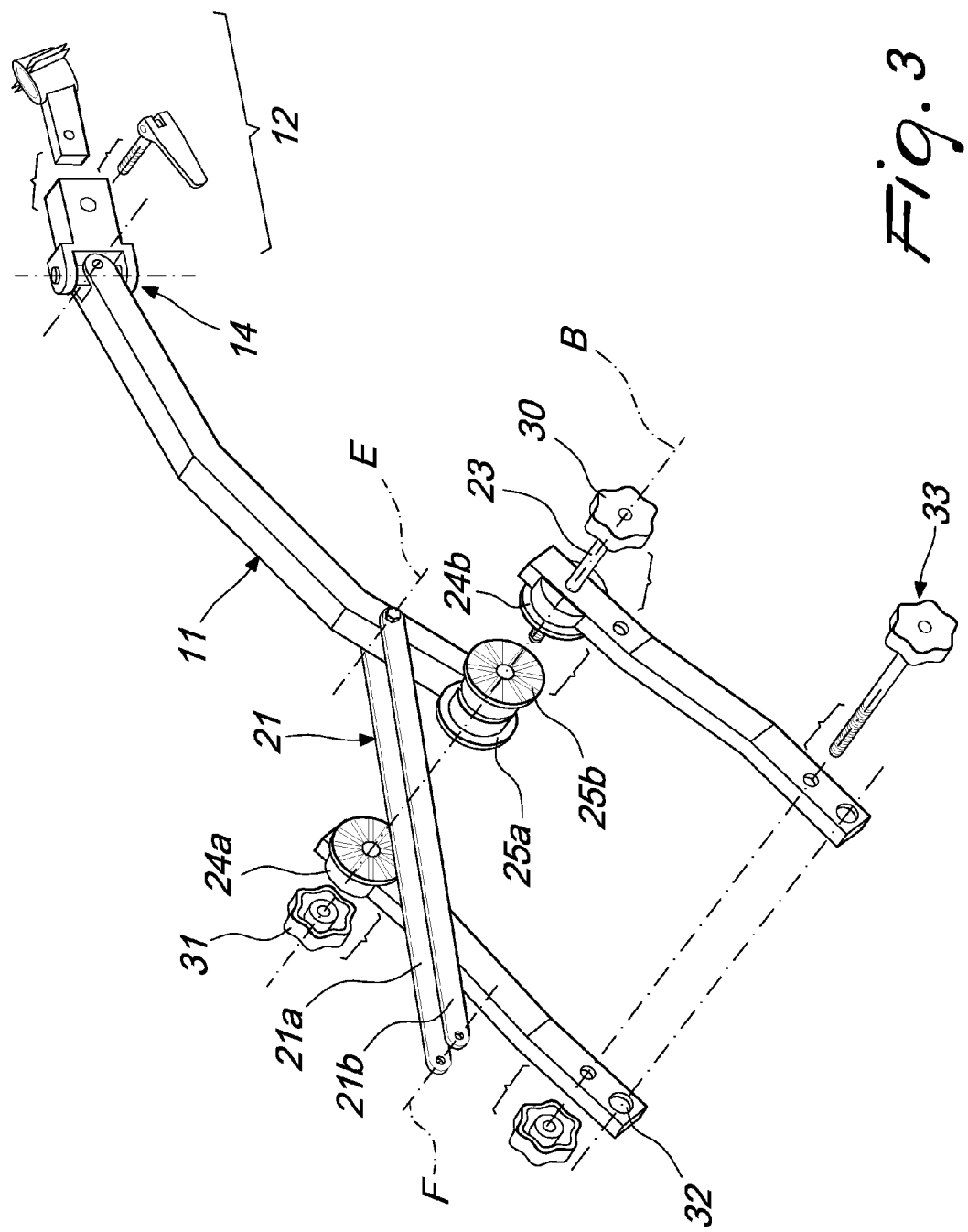

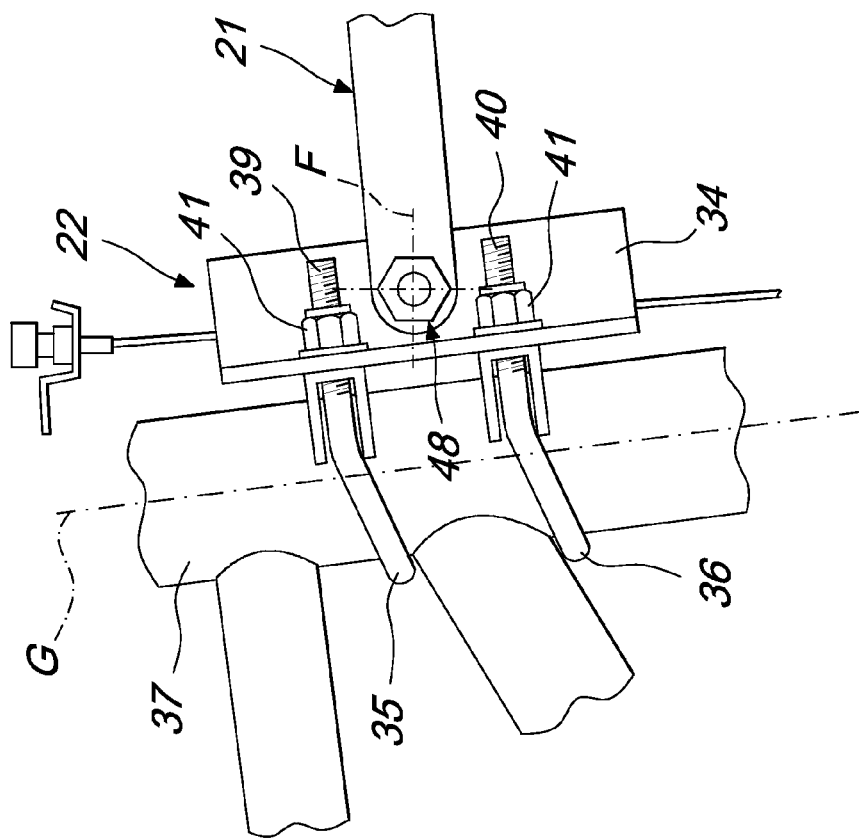
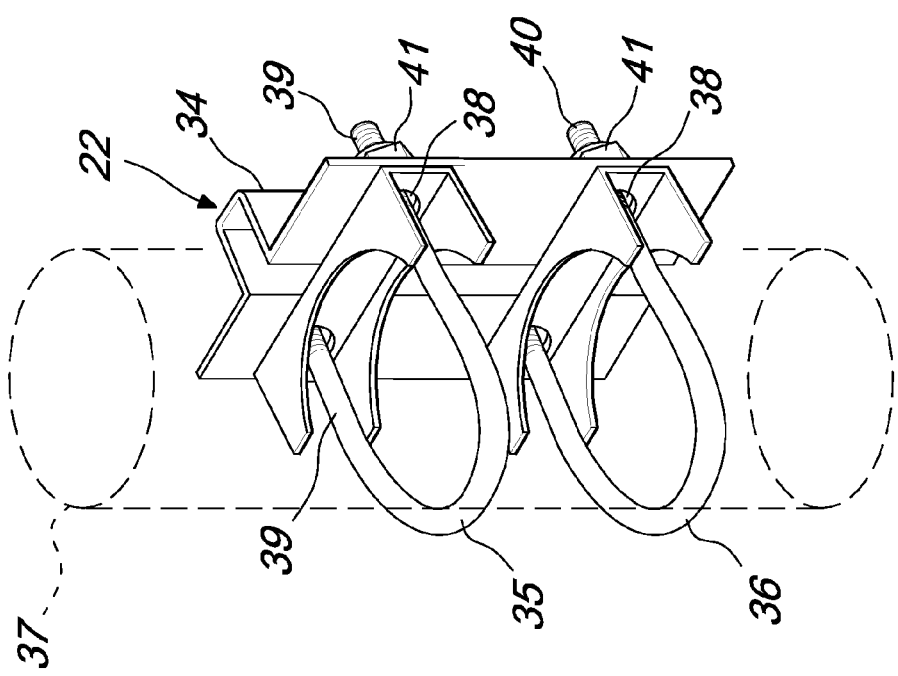
Fig. 5
Fig. 4

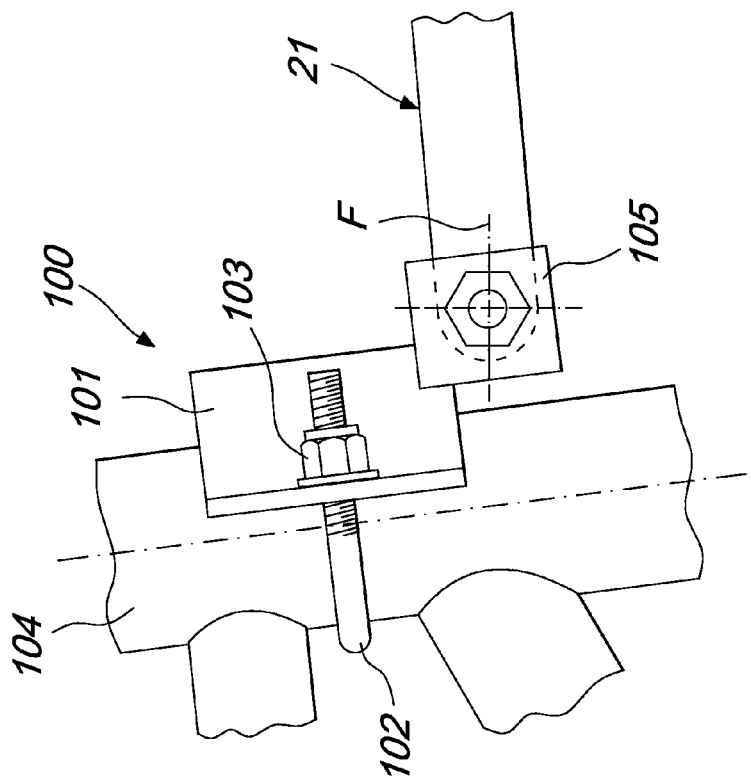
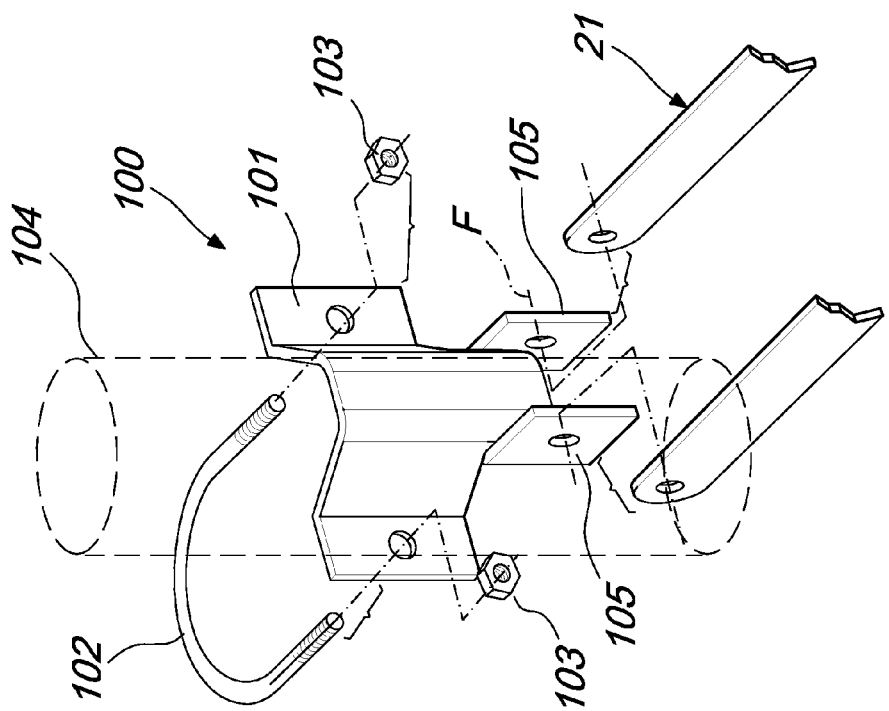

APPARATUS FOR TOWING BICYCLES

TECHNICAL FIELD

The present invention relates to an apparatus for towing vehicles, in particular bicycles, particularly for towing children's bicycles or the like.

BACKGROUND OF THE INVENTION

Nowadays several types of apparatuses are known for the towed connection of a children's bicycle to another, an adult's, bicycle.

A first type of such structures is provided with a contoured arm provided at a first end with a connector joined thereto by way of a universal joint.

The connector is adapted to be integrally coupled to the shank or to the head tube of the saddle of the towing bicycle.

When the connector is coupled to the towing bicycle, the universal joint enables, with respect thereto, the oscillation of the arm with respect to an axis that is substantially parallel to the ground and with respect to an axis that is substantially perpendicular to the ground.

At the second end, the arm is provided with an upward-curved lug which is provided, at the antinode, with pins with nuts for connection to the fork of the bicycle to be towed, replacing the corresponding wheel.

Moreover, at the free end tip of the lug, the arm is provided with a bracket for the integral coupling thereof with the lower tube of the frame of the bicycle to be towed.

Thus, the arm, when joined to both bicycles, towing and being towed, prevents both the rolling and the pitching of the towed bicycle with respect to the towing bicycle.

A drawback of this type of apparatus consists in that in order to join the two bicycles it is necessary to remove the front wheel of the bicycle to be towed, in order to couple the towing arm to the fork.

Not only is the operation for mounting and dismounting the front wheel complicated, but also, during use, the fact that the towed bicycle is deprived of its front wheel prevents the temporary use thereof once it is detached from the towing bicycle, unless the wheel is remounted.

Therefore, such an apparatus is extremely inconvenient for the parent who intends to accompany the child, by towing his or her bicycle, to a safe place where he or she can be allowed to freely use his or her bicycle.

In fact the parent would have to dismount the front wheel of the child's bicycle in order to connect the towing apparatus thereto and accompany the child to where he or she can use his or her bicycle, then re-mount the wheel and subsequently dismount it again for the return trip, with the added inconvenience that, during the towing, the dismounted front wheel must be brought along so that it can be re-mounted when needed.

An apparatus has been devised in order to avoid the dismounting of the front wheel of the bicycle to be towed, whose arm is provided at the two opposite ends with connectors to the head tubes of the saddles of the bicycles, towing and being towed, and, in an intermediate position on the arm, it is provided with a transverse secondary arm which juts out to be connected to the hub of the front wheel on one side thereof.

Such a structure, however, is cumbersome since, at the end thereof for connection to the bicycle to be towed, the main arm runs laterally to the frame thereof thus interfering with the legs of the cyclist who has mounted it.

A further apparatus which is described in detail in EP 0966383 comprises a telescopic towing arm provided at its two ends with corresponding connectors, one for the connection to the head tube of the saddle of the towing bicycle and one for the connection to the head tube of the steering column of the bicycle to be towed.

The connector between the towing arm and the head tube of the steering column of the bicycle to be towed consists in a flange and two U-shaped brackets with threaded ends.

The brackets are mounted on the head tube so that their threaded ends are inserted through the flange that is placed at the front of the head tube.

Shims are interposed between the head tube and the flange at either one bracket or the other, for adjusting the angle of inclination of the bracket, on which the height depends to which the front wheel of the bicycle to be towed is lifted, when it is fixed to the arm joined to the towing bicycle.

A drawback of this structure consists in the complexity of the prearrangement of the shims for adjusting the upward pitch of the bicycle to be towed, substantially as a function of the size thereof.

BRIEF SUMMARY OF THE INVENTION

The aim of the present invention is to provide a towing apparatus that overcomes the drawbacks of the conventional structures, allowing a simple and quick installation.

Within this aim, an object of the invention is to provide a towing apparatus, particularly for children's bicycles, that makes it possible to avoid removing the front wheel of the bicycle to be towed, in order to tow it, and which makes it possible to easily release it.

Another object of the invention is to provide a towing apparatus that makes it possible to effectively hold the bicycle to be towed to the towing bicycle, so as to prevent rolling oscillations of the towed bicycle with respect to the towing bicycle.

Another object of the invention is to provide a towing apparatus that can be easily adapted to the type and size of the bicycle to be towed.

Another object of the invention is to provide a towing apparatus that makes it possible to hold the bicycle to be towed stable with respect to the towing bicycle, more safely than in conventional apparatuses.

Another object of the invention is to provide a towing apparatus that is structurally simple and easy to use, and can be implemented at low cost.

This aim and these and other objects which will become more apparent hereinafter, are achieved by an apparatus for towing bicycles, particularly for towing children's bicycles or the like, comprising a towing arm, a connector, which is adapted to fix said arm to a towing vehicle, particularly to a bicycle, a joint for interconnection between said arm and said connector, which defines, for said arm, with respect to said joint, a first oscillation axis and a second oscillation axis, said first oscillation axis being substantially parallel to the resting surface of a towing vehicle to which said connector is correctly coupled during use, said first oscillation axis being furthermore substantially transverse to the anteroposterior direction of said towing vehicle, said second oscillation axis being substantially perpendicular to said resting surface, said apparatus being characterized in that it comprises a fork for the connection of said arm to the hub of the front wheel of the bicycle to be towed, means being provided for locking said fork to said arm so as to jointly connect them during use, and a strut pivoted on said arm, a coupling assembly being provided which is adapted for the connection of said strut to the bicycle to be towed.

BRIEF DESCRIPTION OF THE DRAWINGS

Further characteristics and advantages of the invention will become more apparent from the description of a preferred, but not exclusive, embodiment of the towing apparatus according to the invention, which is illustrated by way of non-limiting example in the accompanying drawings wherein:

FIG. 1 is a side elevation view of a towing apparatus, according to the invention;

FIG. 2 is a partially exploded perspective view of a towing apparatus, according to the invention;

FIG. 3 is a partially assembled perspective view of a towing apparatus, according to the invention;

FIG. 4 is a perspective view of a component of a towing apparatus, according to the invention;

FIG. 5 is an enlarged side elevation view of a detail of a towing apparatus, according to the invention;

FIG. 6 is an enlarged perspective view of a detail of a different embodiment of a towing apparatus, according to the invention;

FIG. 7 is an enlarged side elevation view of a detail of a towing apparatus, according to the invention;

DESCRIPTION OF THE PREFERRED EMBODIMENTS

Figure 8:
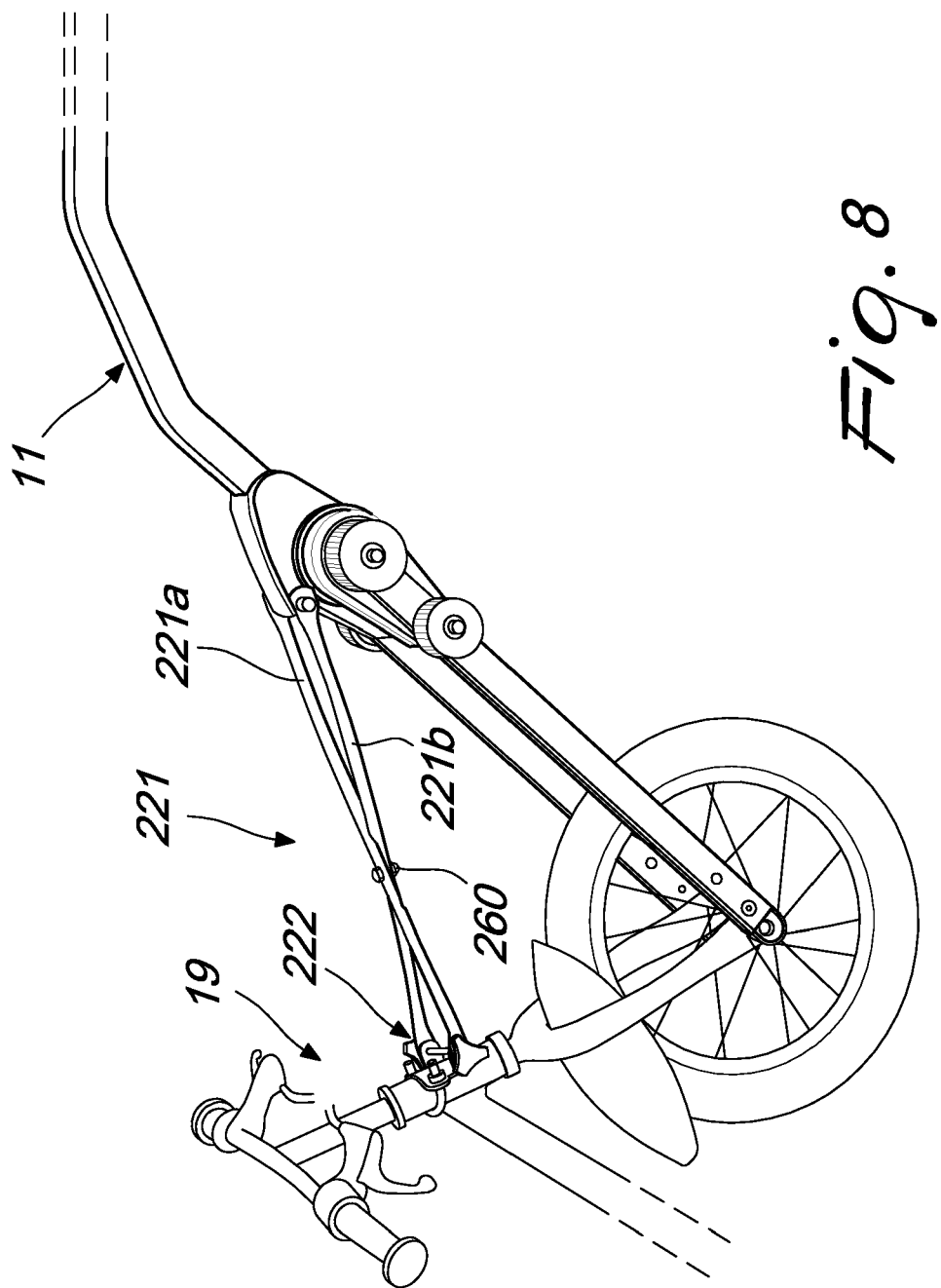
FIG. 8 is a further embodiment of a detail of the towing apparatus according to the invention.

With reference to the figures, the reference numeral 10 generally designates an apparatus for towing bicycles, particularly for towing children's bicycles or the like, that comprises
- a towing arm 11,
- a connector 12, which is adapted to fix the arm 11 to a towing vehicle, particularly to a towing bicycle 13,
- a joint 14, conveniently universal, for interconnection between the arm 11 and the connector 12, which defines, for the arm 11, with respect to the joint 14, a first oscillation axis A and a second oscillation axis B, the first oscillation axis A being substantially parallel to the resting surface 15 of the towing bicycle 13 to which the connector 12 is correctly coupled during use, the first oscillation axis A being furthermore substantially transverse to the anteroposterior direction C of the towing bicycle, the second oscillation axis B being substantially perpendicular to the resting surface 15.

According to the invention, the apparatus 10 has a particular peculiarity in that it comprises
- a fork 16 for the connection of the arm 11 to the hub 17 of the front wheel 18 of the bicycle 19 to be towed, means 20 being provided for locking the fork 16 to the arm 11 in order to jointly connect them during use, and
- a strut 21 pivoted on the arm 11, a coupling assembly 22 being provided which is adapted for the connection of the strut 21 to the bicycle 19 to be towed.

The fork 16 is conveniently pivoted to the arm 11 along a third oscillation axis D which is substantially parallel to the first oscillation axis A.

Conveniently, the strut 21 is pivoted to the arm 11 along a fourth oscillation axis E which is substantially parallel to the first oscillation axis A.

In particular, the fork 16 preferably comprises
- two secondary arms 16a and 16b provided on opposite sides of a first end 11a of the arm 11, the second end 11b of the arm 11 being adapted to be connected to the towing bicycle 13 by way of the connector 12,
- a pivot 23, which passes through the first end 11a and through the secondary arms 16a and 16b so as to connect them, the axis of the pin 23 defining the third oscillation axis D.

The locking means 20 are conveniently interposed between the secondary arms 16a and 16b and the arm 11 and comprise
- first blocks 24a and 24b, which are jointly connected to the secondary arms 16a and 16b,
- second blocks 25a and 25b, which are jointly connected to the arm 11,
- means 26 for the mutual fastening of the first blocks 24a and 24b to the second blocks 25a and 25b,
- means 27 for contrasting the mutual rotation of the first blocks 24a and 24b with respect to the second blocks 25a and 25b, in order to integrally lock them to each other when they are fastened by the fastening means 26.

More specifically, preferably the means 27 for contrasting consist in radial ridges 28 and depressions 29, provided conveniently in alternation on walls of the first blocks 24a and 24b and correspondingly abutting against walls of the second blocks 25a and 25b.

Conveniently, the ridges 28 and the depressions 29 are substantially radial to the third oscillation axis D so as to contrast the mutual rotation of the first blocks 24a and 24b with respect to the second blocks 25a and 25b when they are tightened thus arranging the ridges 28 seated in the depressions 29.

The fastening means 26 preferably comprise a first head 30, in the form of a knob, integral with one end of the pivot 23, and a second head 31, also in the form of a knob, provided with a female thread adapted to receive through screwing the second end of the pivot 23, which is threaded for this purpose.

During use, the heads 30 and 31 tighten between them, threaded onto the pivot 23,
- the secondary arms 16a and 16b,
- the blocks 24a, 24b, 25a and 25b and
- the first end 11a of the arm 11, in order to mutually tighten them upon the mutual screwing of the second head 31 onto the pivot 23, which is integral with the first head 30.

Preferably, the secondary arms 16a and 16b are provided with engagement seats 32 for the ends of the hub 17 of the wheel 18 of the bicycle 19 to be towed.

The engagement seats 32 are conveniently provided at a first end of the secondary arms 16a and 16b, opposite to their second end which is pivoted to the arm 11.

Of these engagement seats 32, in FIGS. 2 and 3, only the one provided on the first secondary arm 16a is visible, the corresponding one provided on the second secondary arm 16b being hidden.

Advantageously, the apparatus 10 comprises means 33 for clamping the secondary arms 16a and 16b to each other, for the clamping thereof onto the hub 17 when the ends of the hub 17 are inserted in the engagement seats 32, for the stable coupling of the hub 17 to the fork 16.

The coupling assembly 22 is pivoted to the strut 21 conveniently so as to oscillate about a fifth axis of oscillation F, which is substantially parallel to the fourth oscillation axis E.

Moreover, the strut 21 comprises two parallel elements 21a and 21b which are connected, at their opposite ends, to the arm 11 and to the coupling assembly 22.

The coupling assembly 22 conveniently comprises a flange 34 for pivoting to the strut 21 and brackets 35 and 36 for fixing to the head tube 37 of the handlebar of a bicycle 19 to be towed.

The coupling assembly 22, when it is connected to the head tube 37, determines a substantially perpendicular arrangement between the fifth oscillation axis F and the longitudinal axis G of the head tube 37.

In particular, conveniently, the flange 34 is provided with holes 38 for threading the threaded ends 39 and 40 of the brackets 35 and 36, in order to lock them to the flange 34 by means of nuts 41.

The means for clamping 33 conveniently comprise a rod 42 which at one end is provided with a first abutment 43, in the form of a knob, integral therewith, which at the second end, which is threaded, is provided with a second abutment 44 with a female thread, in the form of a knob.

Moreover, the secondary arms 16a and 16b are advantageously provided with corresponding through holes 45a and 45b, 46a and 46b, for the insertion of the rod 42.

Thus, during use, when the hub 17 is inserted into the engagement seats 32, for locking the fork 17 thereto the rod 42 is inserted through the through holes 45a and 45b or 46a and 46b and the second abutment 44 is tightened thereon so as to clamp the fork 16 coupled with the hub 17 between the abutments 43 and 44.

Advantageously, the first through holes 45a and 45b of the through holes 45a and 45b, 46a and 46b are provided proximate to the engagement seats, so that when the rod 42 clamps the fork 16 onto the hub 17, it passes between the spokes of the wheel 18 of the bicycle 19 to be towed.

The second through holes 46a and 46b of the through holes 45a and 45b, 46a and 46b are instead conveniently provided in proximity to the end of the secondary arms 16a and 16b for pivoting to the arm 11, so as to be able to be engaged by the rod 42 which during use does not pass between the spokes of the wheel 18.

Thus, in order to lock the fork 16 to the hub 17 of the bicycle 19 to be towed the user can choose whether to insert the rod through the first through holes 45a and 45b, as illustrated by way of example by the dotted line in FIG. 1, or alternatively through the second through holes 46a and 46b, depending on the contingent requirements of use.

Advantageously, at the free ends of the secondary arms 16a and 16b means of fastening the fork 16 to the towing bicycle 13, not shown in the accompanying figures, are provided.

In particular, such fastening means can be defined by the engagement seats 32, if the ends of the hub of the front wheel of the towing bicycle 13 are free from devices, for example for changing gear.

Otherwise, such fastening means can be provided by way of clips adapted to snap onto and grip the lower tube 13a of the frame of the towing bicycle 13.

Thus, when the fork 16 is not engaged on the bicycle 19 to be towed, it can be directed toward the towing bicycle 13 and fixed thereto, in order to not impede the use thereof, as illustrated by way of non-limiting example in FIG. 1 in dotted lines.

Conveniently, when the fork 16 is fixed thus to the towing bicycle 13, the parallel elements 21a and 21b are also folded onto the arm 11, and fixed thereto, for example with a strip with Velcro® fastening or by way of elastic clips fixed to the arm 11 or other equivalent means of retention, which are not shown in the accompanying figures.

In an alternative embodiment of the coupling assembly 22, shown by way of example in FIGS. 6 and 7, wherein it is designated with the reference numeral 100, it comprises a contoured flange 101 which is substantially V-shaped and a bracket 102 which is substantially U-shaped and is adapted to hold it, for example by means of nuts 103, coupled to the head tube 104 of the steering column of the bicycle to be towed.

Thus, when the coupling assembly 100 is associated with the head tube 104, the latter is wedged in the flange 101 which is held thereto by the bracket 102 in a fixed manner, so as to help prevent the rolling of the bicycle 19 to be towed with respect to the towing bicycle 13.

From the back of the contoured flange 101, two perforated tabs 105 conveniently protrude, adapted to be joined to the strut 21 conveniently so that it can rotate about the fifth oscillation axis F which is preferably defined by a bolt 106 adapted to join them.

FIG. 8 shows further embodiment of the strut, designated therein with the reference numeral 221, pivoted to the arm 11 and coupled by means of a corresponding coupling assembly 222 to the bicycle 19 to be towed.

The strut 221 comprises two elements 221a and 221b which are not parallel as in the embodiment of the invention described above, but instead are crossed and scissor-hinged by means of a pivoting screw 260.

The use of an apparatus 10, according to the invention, is as follows.

The user fixes a first part 12a of the connector 12 to the upright 47 of the saddle of the towing bicycle 13.

Then the user connects the part 12a to the arm 11 by coupling the second part 12b of the connector 12 to the first part 12a, integrally fixing them.

Then, the user installs, on the bicycle 19 to be towed, the coupling assembly 22 to which the parallel elements 21a and 21b are pivoted advantageously by means of a bolt 48.

Conveniently the bolt 48 is provided at its head with a pivoting lever with a pull cam which is known per se and not shown in the accompanying figures, adapted to allow quick and reversible tightening, by way of rotation of the lever, and locking, by way of pushing down the lever, where both operations are particularly easy to perform by hand.

With the first blocks 24a and 24b loosened from the second blocks 25a and 25b, by at least partial loosening of the second head 26 from the pivot 23, the fork 16 is opened at least partially to encompass the hub 17 and insert the ends thereof into the engagement seats 32.

For locking the fork 16 to the hub 17 it is rotated about the third oscillation axis D, proportionally according to the size of the bicycle 19 to be towed.

Then, the rod 42 is inserted through the first through holes 45a and 45b, or through the second through holes 46a and 46b, and tightened therein by clamping of the fork 16.

Then, the blocks 24a and 25a, and 24b and 25b are mutually tightened, so as to keep the wheel 18 raised with respect to the resting surface 15.

In order to release the bicycle 19 to be towed, the user simply removes the rod 42, loosens the blocks 24a and 25a, and 24b and 25b, and disconnects the coupling assembly 22.

In practice it has been found that the invention fully achieves the intended aim and objects by providing a towing apparatus that overcomes the drawbacks of conventional structures by allowing a simple and quick installation.

Moreover, an apparatus according to the invention, particularly for the towing of children's bicycles, makes it possible to avoid removing the front wheel of the bicycle to be towed, in order to tow it, and makes it possible to easily release it.

An apparatus according to the invention likewise makes it possible to effectively hold the bicycle to be towed to the towing bicycle, so as to prevent rolling oscillations of the towed bicycle with respect to the towing bicycle, thanks to the combined action of the fork, which supports the bicycle to be towed, and of the strut, which prevents the rolling thereof with respect to the towing bicycle.

What is more, a towing apparatus according to the invention is easily adaptable to the type and size of the bicycle to be towed and likewise makes it possible to hold the bicycle to be towed stable with respect to the towing bicycle, more safely than in conventional apparatuses Moreover, a towing apparatus according to the invention is structurally simple, easy to use and can be produced at relatively low cost.

The invention, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. PD2011A000035 from which this application claims priority are incorporated herein by reference.

What is claimed is:

1. An apparatus for towing bicycles, comprising:
   a towing arm;
   a connector, which is adapted to fix said towing arm to a towing vehicle;
   a joint for interconnection between said towing arm and said connector, which defines, for said towing arm, with respect to said joint, a first oscillation axis and a second oscillation axis, said first oscillation axis being substantially parallel to the resting surface of a towing vehicle to which said connector is correctly coupled during use, said first oscillation axis being furthermore substantially transverse to an anteroposterior direction of the towing vehicle, said second oscillation axis being substantially perpendicular to said resting surface;
   a fork for connection of said towing arm to a hub of a front wheel of the bicycle to be towed, locking means for locking said fork to said towing arm in order to jointly connect said fork and towing arm during use, wherein the fork is pivoted to said towing arm along a third oscillation axis which is substantially parallel to said first oscillation axis, said fork comprising:
   two secondary arms provided on opposite sides of a first end of said towing arm, a second end of said towing arm being adapted to be connected to the towing vehicle by way of said connector,
   a pivot, which passes through said first end and through said secondary arms so as to connect said first end and secondary arms, defining said third oscillation axis,
   wherein said locking means are interposed between said secondary arms and said towing arm and comprise:
   first blocks jointly connected to said secondary arms,
   second blocks jointly connected to said towing arm,
   fastening means for a mutual fastening of said first blocks to said second blocks; and
   rotation contrasting means for contrasting mutual rotation of said first blocks with respect to said second blocks when said first and second blocks are fastened by said fastening means; and
   a strut pivoted on said towing arm, a coupling assembly being provided which is adapted for connection of said strut to the bicycle to be towed.

2. The apparatus of claim 1, wherein said strut is pivoted to said towing arm along a fourth oscillation axis which is substantially parallel to said first oscillation axis.

3. The apparatus of claim 2, wherein said coupling assembly is pivoted to said strut so as to oscillate about a fifth oscillation axis, which is substantially parallel to said fourth oscillation axis.

4. The apparatus of claim 3, wherein said coupling assembly comprises a flange for pivoting to said strut and brackets for fixing to a head tube of a frame of the bicycle to be towed, said coupling assembly, connected to the head tube, determining a substantially perpendicular arrangement between said fifth oscillation axis and the longitudinal axis of said head tube.

5. The apparatus of claim 1, wherein said secondary arms have engagement seats for the ends of the hub of the front wheel of the bicycle to be towed, said engagement seats being provided at a first end of said secondary arms which lies opposite to a second end thereof which is pivoted to said towing arm.

6. The apparatus of claim 5, comprising clamping means for clamping said secondary arms toward each other, for a clamping thereof on said hub when said ends of said hub are inserted in said engagement seats, for a stable mating of said hub with said fork.

7. The apparatus of claim 1, wherein said strut comprises two parallel elements which are connected, at opposite ends thereof, to said towing arm and to said coupling assembly.

* * * * *